US010158776B2

(12) United States Patent
Kim et al.

(10) Patent No.: US 10,158,776 B2
(45) Date of Patent: Dec. 18, 2018

(54) IMAGE FORMING APPARATUS (71) Applicant: S-Printing Solution Co., Ltd., Suwon-si (KR)

(72) Inventors: Jeong-yul Kim, Yongin-si (KR); Kyung-rok Kim, Seongnam-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/673,674

(22) Filed: Aug. 10, 2017

(65) Prior Publication Data
US 2018/0205843 A1 Jul. 19, 2018

(30) Foreign Application Priority Data

Jan. 17, 2017 (KR) ........................ 10-2017-0007946

(51) Int. Cl.
*H04N 1/00* (2006.01)
*H04N 1/10* (2006.01)

(52) U.S. Cl.
CPC ..... *H04N 1/00708* (2013.01); *H04N 1/00737* (2013.01); *H04N 1/1043* (2013.01); *H04N 1/00755* (2013.01); *H04N 1/00761* (2013.01); *H04N 2201/0081* (2013.01)

(58) Field of Classification Search
CPC ....... H04N 2201/0081; H04N 1/00278; H04N 1/02845; H04N 1/0285; H04N 1/02855; H04N 1/02865; H04N 1/1013; H04N 1/193; H04N 2201/0094; H04N 2201/02462; H04N 2201/0434; H04N 1/00572; H04N 1/00795; H04N 1/486; H04N 1/50; H04N 1/00981; H04N 1/03; H04N 5/3694; G02B 6/0031; G02B 6/0033; G02B 6/0045; G02B 6/0055; G02B 6/0073; G03B 27/542
USPC ................ 358/475, 474, 509; 362/607, 609; 498/358
See application file for complete search history.

(56) References Cited

U.S. PATENT DOCUMENTS

| 4,812,917 A * | 3/1989 | Suzuki ...................... H04N 1/03 358/451 |
| 4,892,299 A * | 1/1990 | Hayama ................... B65H 7/04 271/110 |
| 5,608,537 A * | 3/1997 | Manabe ............. H04N 1/00267 347/2 |

(Continued)

FOREIGN PATENT DOCUMENTS

| JP | 2006-5834 | 1/2006 |
| JP | 2012-39316 | 2/2012 |

(Continued)

*Primary Examiner* — Negussie Worku
(74) *Attorney, Agent, or Firm* — Staas & Halsey LLP (57) ABSTRACT An image forming apparatus includes a scanner and a printing apparatus, wherein the scanner includes a scanning window; a transport unit configured to transport a document to a top surface of the scanning window; a scan unit configured to obliquely irradiate light to a bottom surface of the scanning window to scan the document; a transport guide member configured to be disposed to face the top surface of the scanning window to guide a transport of the document; and a curved reflection member configured to be coupled to the transport guide member to collect the light irradiated from the scan unit and to reflect the collected light toward the scanning window.

20 Claims, 7 Drawing Sheets (56) References Cited

U.S. PATENT DOCUMENTS

| | | | |
|---|---|---|---|
| 8,665,502 B2 | 3/2014 | Masaki et al. | |
| 8,867,107 B1 | 10/2014 | Shimizu | |
| 9,055,175 B2 | 6/2015 | Shimizu | |
| 9,065,949 B2 * | 6/2015 | Takahashi | H04N 1/00713 |
| 9,106,773 B2 | 8/2015 | Kobayshi | |
| 9,531,913 B1 * | 12/2016 | Shiraishi | H04N 1/1013 |
| 9,605,841 B2 * | 3/2017 | Chou | F21V 29/004 |
| 2017/0295290 A1 * | 10/2017 | Yoshida | H04N 1/02855 |

FOREIGN PATENT DOCUMENTS

| | | |
|---|---|---|
| JP | 2015-19213 | 1/2015 |
| JP | 2015-133752 | 7/2015 |
| JP | 5987616 | 8/2016 |
| KR | 10-0338082 | 5/2002 |

* cited by examiner

IMAGE FORMING APPARATUS

CROSS-REFERENCE TO RELATED APPLICATION

This application claims priority from Korean Patent Application No. 10-2017-0007946, filed on Jan. 17, 2017, in the Korean Intellectual Property Office, the disclosure of which is incorporated herein by reference in its entirety.

BACKGROUND OF THE INVENTION

Field of the Invention

Apparatuses consistent with the present disclosure relate to an image forming apparatus, and more particularly to an image forming apparatus including a scanner sensing a size of a document.

Description of the Related Art

A scanner is an apparatus that irradiates light to a document and converts an image of the document into data through the light reflected from the document.

The scanner itself is a single device, but may be coupled to an image forming apparatus such as a printer, a copy machine, a facsimile, or a multi-function peripheral implemented by incorporating functions thereof into a single apparatus, and consequently, the image of the document obtained through the scanner may be printed on a printing medium.

A conventional image forming apparatus including the scanner includes an automatic document feeder (ADF) that transports a plurality of documents loaded in a document input tray one by one to a scan unit for convenience, and may print the image of the document scanned by the scan unit on the printing medium through a printing apparatus.

The conventional image forming apparatus includes separate apparatuses sensing a size of the scanned document to print the image on the printing medium having a size corresponding to the size of the scanned document. For example, the conventional image forming apparatus includes a guide document for aligning the documents by being coupled onto the document input tray in which the documents are loaded and adjusting an interval thereof, and directly determines a width of the document by measuring the interval of the guide document through a separate sensor. Further, the size of the loaded document was directly measured by coupling an optical sensor, a proximity sensor, and the like to the document input tray.

However, the conventional image forming apparatus had a disadvantage in that a structure thereof is complex or manufacturing cost is increased due to the separate sensors used to sense the size of the document.

SUMMARY OF THE INVENTION

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an image forming apparatus including a scanner having a compact structure and sensing a size of a document at low cost.

According to an aspect of the present disclosure, an image forming apparatus includes a scanner and a printing apparatus, wherein the scanner includes a scanning window; a transport unit configured to transport a document to a top surface of the scanning window; a scan unit disposed below a bottom surface of the scanning window and configured to obliquely irradiate light toward the bottom surface of the scanning window to scan the document; a transport guide member disposed above the top surface of the scanning window to guide the transport of the document; and a curved reflection member coupled to the transport guide member and configured to reflect the light irradiated from the scan unit toward the scanning window.

The curved reflection member may be disposed below the transport guide member, and may have a shape which is concave with respect to the scan unit.

The transport guide member may include a curved portion formed to be concave with respect to the scan unit, and the curved reflection member may be coupled to the curved portion and the shape of the curved reflection member corresponds to a shape of the curved portion.

The curved reflection member may include a synthetic resin sheet having near-specular characteristics.

The synthetic resin sheet may be a polyethylene terephthalate (PET) sheet.

The curved reflection member is concave with respect to the scan unit along a direction of the transport of the document.

The curved reflection member is concave with respect to the scan unit along a direction perpendicular to the direction of the transport of the document.

The curved reflection member may be disposed to be inclined with respect to the top surface of the scanning window in a direction towards the light irradiated from the scan unit.

A depth of a reflective surface of the curved reflection member may be configured to be 0.0125 to 0.1375 times of a width of the curved reflection member.

The width of the curved reflection member may be configured to be 4 mm, and the depth of the reflective surface may be configured to be 0.25 mm.

The scan unit may include an image sensor configured to convert incident light on the image sensor into image data; a light emitting unit configured to obliquely irradiate the light at a first angle with respect to the bottom surface of the scanning window; and at least one reflector disposed below the scanning window and configured to reflect the light reflected from the curved reflection member to the image sensor.

The curved reflection member may be disposed to be inclined so that a virtual straight line connecting one end disposed at an upstream of the document transport direction and the other end disposed at a downstream of the document transport direction forms a second angle, which is an acute angle, with respect to the top surface of the scanning window.

The second angle may be configured to be 0.3 to 0.475 times of the first angle.

The first angle may be configured to be 40°, and the second angle may be configured to be 14° to 17°.

A width of the curved reflection member may be configured to be 4 mm, and a depth of a reflective surface of the curved reflection member may be configured to be 0.25 mm, and the first angle may be configured to be 40°, and the second angle may be configured to be 15°.

According to another aspect of the present disclosure, an image forming apparatus including a scanner and a printing apparatus includes a scan unit configured to irradiate light towards a document passing through a scan path of the scan unit, to receive the irradiated light to scan the document, and to determine a size of the document based on the received light; and a curved reflection member disposed above the document on the scan path and configured to reflect the light irradiated from the scan unit back to the scan unit.

The curved reflection member is concave with respect to the scan unit along a direction in which the document passes through the scan path.

The curved reflection member may be disposed to be inclined with respect to the document passing through the scan path in a direction facing the light irradiated from the scan unit.

The curved reflection member may include a polyethylene terephthalate (PET) sheet having near-specular characteristics.

According to still another aspect of the present disclosure, an image forming apparatus includes a scanner and a printing apparatus, wherein the scanner includes a scanning window; a transport unit configured to transport a document to a top surface of the scanning window; first and second light emitting units disposed below a bottom surface of the scanning window and configured to obliquely irradiate light toward the bottom surface of the scanning window; an image sensor configured to convert incident light on the image sensor into image data; a transport guide member disposed above the top surface of the scanning window to guide the transport of the document; first and second curved reflection members coupled to the transport guide member and configured to reflect the light irradiated from the first and second light emitting units toward the scanning window; and at least one reflector disposed below the scanning window and configured to reflect the light reflected from the first and second curved reflection members toward the image sensor.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Hereinafter, exemplary embodiments of the present disclosure will be described in detail with reference to the accompanying drawings. The exemplary embodiments described below will be described based on exemplary embodiments which are most suitable for understanding technical characteristics of the present disclosure, and illustrate that the technical characteristics of the present disclosure are not limited by the exemplary embodiments described below, but the present disclosure may be implemented as in the exemplary embodiments described below.

Therefore, the present disclosure may be variously modified within a technical scope of the present disclosure through the exemplary embodiments described below, and the modified exemplary embodiments fall within the technical scope of the present disclosure. In addition, in order to help understand the exemplary embodiments described below, in regard to reference numerals indicated on the accompanying drawings, the related components of components that perform the same operation in the respective exemplary embodiments are indicated by the same or extension numeral.

Figure 1:
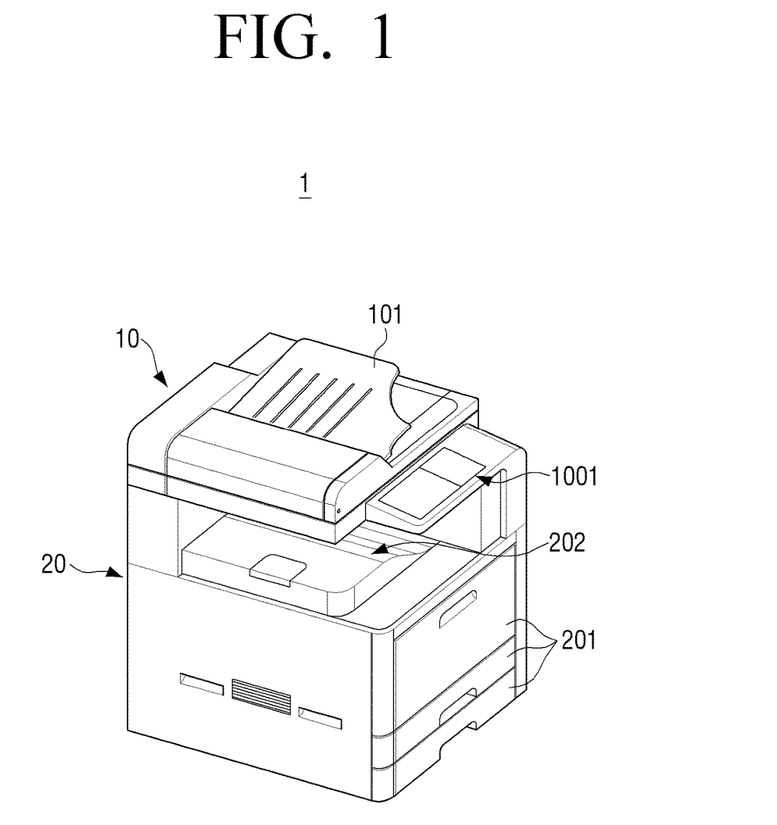
FIG. 1 is a perspective view illustrating an image forming apparatus according to an exemplary embodiment of the present disclosure.

FIG. 1 is a perspective view illustrating an image forming apparatus 1 according to an exemplary embodiment of the present disclosure.

The image forming apparatus 1 according to the present disclosure will be described, for example, as a multi function peripheral (MFP) in which functions of a printer, a copy machine, a scanner, and a facsimile are implemented in a single apparatus in a complex manner.

As illustrated in FIG. 1, the image forming apparatus 1 according to an exemplary embodiment of the present disclosure includes a scanner 10 and a printing apparatus 20 disposed below the scanner 10.

The scanner 10 may automatically transport a document loaded in a document input tray 101 to the inside of the scanner 10 to scan the document, and an image of the document obtained by the scanner 10 may be printed on a printing medium through the printing apparatus 20.

Since the scanner 10 and the printing apparatus 20 are each configured in a module type, the scanner 10 and the printing apparatus 20 may be configured in a structure in which they are coupled to each other or are separated from each other, if necessary, and further, the scanner 10 and the printing apparatus 20 may also be configured in a structure in which they are formed integrally with each other.

The printing apparatus 20 may load the printing mediums in a plurality of feeding apparatuses 201 coupled separably to one side thereof, and the printing mediums loaded in the plurality of feeding apparatuses 201 are inserted into the inside of the printing apparatus 20, such that the image may be printed on the printing mediums through an image forming part (not shown). The printed printing mediums may be discharged to a printing medium output part 202.

In addition, the scanner 10 may have a manipulating part 1001 disposed at one side thereof.

The manipulating part 1001 includes an input part receiving an operation instruction of a user, a display displaying an operation state of the image forming apparatus 1, and a controller (not shown).

The manipulating part 1001 may input the operation instruction to the scanner 10 and the printing apparatus 20 through the input part, and may display the operation state of the scanner 10 and the printing apparatus 20 through the display.

Since the image forming apparatus 1 including the scanner 10 and the printing apparatus 20 illustrated in FIG. 1 has a configuration and a structure similar to the conventional image forming apparatus 1, a detailed description of the known configuration and structure will be omitted.

Figure 2:
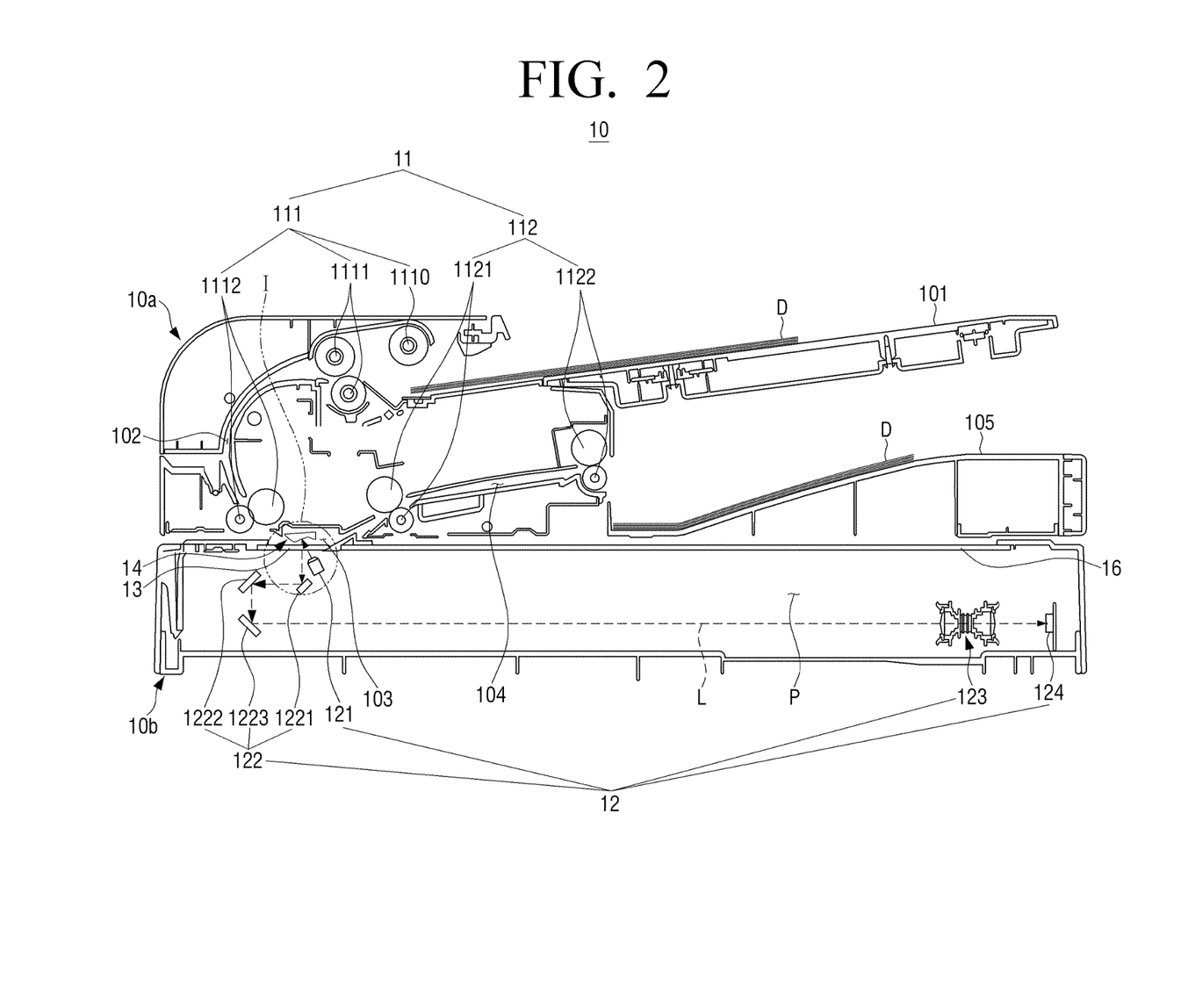
FIG. 2 is a side view illustrating the inside of a scanner illustrated in FIG. 1.

FIG. 2 is a side view illustrating the inside of the scanner 10 illustrated in FIG. 1. Hereinafter, a structure of the scanner 10 will be described in detail with reference to FIG. 2.

The scanner 10 includes an upper frame 10a and a lower frame 10b that configure an appearance thereof. The upper frame 10a may be rotatably coupled to the lower frame 10b to open and close a top surface of the lower frame 10b.

The upper frame 10a includes a document input tray 101 in which a document D for scanning is loaded, and a document output tray 105 disposed below the document input tray 101 and having the scanned and discharged document D loaded therein.

A transport path 102 connected to the document input tray 101, a scan path 103 connected to the transport path 102, and an output path 104 connected to the scan path 103 are sequentially formed in the upper frame 10a, and the output path 104 is connected to the document output tray 105 described above.

A transport unit 11 that picks-up the document D loaded in the document input tray 101 and transports the document D along the transport path 102, the scan path 103, the output path 104, and the document output tray 105 is disposed in the upper frame 10a.

The transport unit 11 may be an automatic document feeder (ADF) that automatically feeds the document D loaded in the document input tray 101 to the scan path 103 one by one, and the document D passing through the scan path 103 through the transport unit 11 may be discharged to the document output tray 105.

The scan path 103 is a space opened to face a scanning window 13 disposed on the top surface of the lower frame 10b to be described below, and the document D passing through the scan path 103 through the transport unit 11 may again reflect light irradiated through the scanning window 13 to the scan unit 12 through the scanning window 13, and as a result, the scan unit 12 may scan an image displayed on the document D.

The transport path 102 is disposed between the document input tray 101 and the scan path 103, and is a channel in which the document D is moved until the document D loaded in the document input tray 101 is input to the scan path 103.

The output path 104 is disposed between the scan path 103 and the document output tray 105, and is a channel in which the document D which passes through the scan path 103 and is scanned is moved until the document D is discharged to the document output tray 105.

The transport unit 11 includes a feeding part 111 that transports the document loaded in the document input tray 101 to the scan path 103, an outputting part 112 that discharges the document which passes through the scan path 103 and is scanned to the document output tray 105, and a driving part (not shown) that drives and the transport unit 11.

The feeding part 111 of the transport unit 11 includes a pick-up roller 1110, a pair of first transport rollers 1111, and a pair of second transport rollers 1112.

The pick-up roller 1110 is disposed to be adjacent to one end of the document input tray 101 which is adjacent to the transport path 102 and is rotated, thereby picking-up the document D loaded in the document input tray 101 one by one. The document D picked-up by the pick-up roller 1110 is inserted into the transport path 102 through a pair of first transport rollers 1111, and the document D moved from the upstream to the downstream along the transport path 102 is inserted into the upstream of the scan path 103 through a pair of second transport rollers 1112 disposed at the downstream of the transport path 102.

The outputting part 112 includes a pair of first output rollers 1121 and a pair of second output rollers 1122.

The pair of first output rollers 1121 is disposed between the downstream of the scan path 103 and the upstream of the output path 104 to insert the document D passing through the scan path 103 to the output path 104, and the pair of second output rollers 1122 disposed at the downstream of the output path 104 discharges the document D passing through the output path 104 to the document output tray 105.

The pick-up roller 1110, the pair of first transport rollers 1111, the pair of second transport rollers 1112, the pair of first output rollers 1121, and the pair of second output rollers 1122 described above may be rotated by receiving driving force from the driving part, and the driving part may be controlled by a controller.

The scan unit 12 is disposed inside the lower frame 10b, and the scanning window 13 is disposed on the top surface of the lower frame 10b to face the scan path 103.

The scanning window 103 is formed of a light-transmitting transparent material such as glass, and the light irradiated from the scan unit 12 is transmitted through the scanning window 103, such that the light reflected from the document passing over the scanning window 13 may be again incident on the scan unit 12 through the scanning window 13.

The document D passes through the scan path 103 in a state in which it is sequentially in contact with a top surface 131 (see FIG. 3) of the scanning window 13 from the upper end of the document D to the lower end thereof, thereby being scanned through the scan unit 12. Therefore, the scanning window 13 may have a shape which is extended to be long along a width direction of the document D, and a width of the scanning window 13 may be configured to be smaller than a length of the document D.

The scan unit 12 that obliquely irradiates the light toward a bottom surface 132 (see FIG. 3) of the scanning window 13 to scan the document is disposed below the scanning window 13.

The scan unit 12 includes a light emitting unit 121, at least one reflector 122, a lens part 123, and an image sensor 124.

The light emitting unit 121 may irradiate the light toward the scanning window 13 in a direction inclined with respect to the bottom surface 132 of the scanning window 13. In addition, since the scanning window 13 is formed of the light transmitting transparent material, the light emitting unit 121 may irradiate the light in the inclined direction toward the document D disposed on the top surface 131 of the scanning window 13.

Although FIG. 2 illustrates only one light emitting unit 121, a plurality of light emitting units 121 may be configured and the plurality of light emitting units 121 may be disposed along the width direction of the document D, that is, a length direction of the scanning window 13.

Thereby, the plurality of light emitting units 121 may irradiate the light to an entire area of the document D passing through the top surface 131 of the scanning window 13 by irradiating the light along the length direction of the scanning window 13.

In addition, as illustrated in FIG. 2, first to third reflectors 1221, 1222, and 1223 are disposed below the scanning window 13.

The first reflector 1221 is disposed on a position perpendicular to the bottom surface 132 of the scanning window 13 and reflects the light which is reflected and incident from the document D to the second reflector 1222, the second reflector 1222 reflects the incident light to the third reflector 1223, and the third reflector 1223 reflects the incident light to the lens part 123 and the image sensor 124.

The lens part 123 collects the light reflected from the third reflector 1223 and irradiates the collected light to the image sensor 124.

The image sensor 124 may convert the light passing through the lens part 123 into image data, and the controller may print the image of the document D on the printing medium through the printing apparatus 20 by transmitting the image data of the document D obtained by image sensor 124 to the printing apparatus 20.

Here, the image sensor 124 may include a charge coupled device (CCD), a contact image sensor (CIS), or the like.

Further, a flat scanning window 16 may be disposed on the top surface of the lower frame 10*b*.

The flat scanning window 16 may be formed to be greater than a size of the document so as to scan the document loaded on the top surface thereof one by one. Therefore, the above-mentioned width of the flat scanning window 16 may be configured to be longer than the width of the scanning window 13.

The user may dispose the document so that a front surface of the document is in contact with the top surface of the flat scanning window 16 by opening the upper frame 10*a*, and may prevent external light from being introduced into the flat scanning window 16 by closing the upper frame 10*a* and then scan the document.

The light emitting unit 121 and the reflector 122 of the scan unit 12 may be coupled to a moving bracket (not shown) and may move along the length direction of the document along a movement path P formed below the flat scanning window 16 inside the lower frame 10*b*.

Therefore, in a case in which the document disposed on the flat scanning window 16 is scanned, the light emitting unit 121 and the reflector 122 disposed below the scanning window 13 may irradiate the light to an entirety of document while being moved from a lower side of one end of the flat scanning window 16 to a lower side of the other end opposite to the one end, and the light reflected through the moving reflector 122 passes through the lens part 123 and is irradiated to the image sensor 124, such that an entire image of the document disposed on the top surface of the flat scanning window 16 may be scanned.

Figure 3:
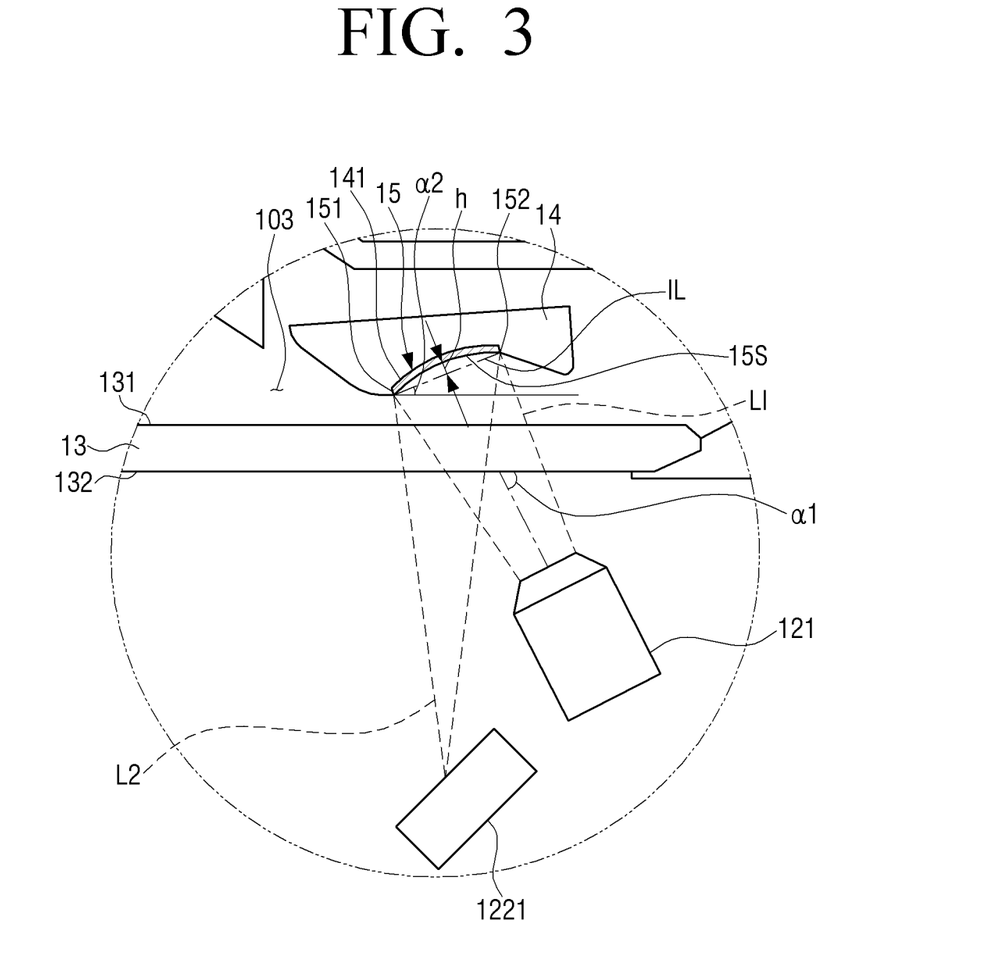
FIG. 3 is an enlarged view of a portion of I of the scanner illustrated in FIG. 2.

FIG. 3 is an enlarged view of a portion of I of the scanner 10 illustrated in FIG. 2.

As illustrated in FIGS. 2 and 3, a transport guide member 14 disposed to face the top surface 131 of the scanning window 13 to guide a transport of the document D is disposed on the scan path 103.

The transport guide member 14 may have a shape of a bar extended along the length direction of the scanning window 13, which corresponds to a shape of the scanning window 13, and may be formed of a synthetic resin material such as plastic.

The transport guide member 14 may pressurize the document D so that the document D inserted into the upstream of the scan path 103 passes through the scan path 103 in a state in which it is closely in contact with the scanning window 13.

To this end, the transport guide member 14 has an elastic member (not shown) coupled to an upper portion thereof, thereby making it possible to pressurize the document D toward the top surface 131 of the scanning window 13 from the front surface of the document D. However, pressure applied to the document D by the transport guide member 14 is preferably set to magnitude that the document D may pass between the transport guide member 14 and the top surface 131 of the scanning window 13.

Further, the transport guide member 14 has one end portion which is adjacent to the upstream of the scan path 103 and is obliquely formed toward the scanning window 13, thereby making it possible to guide the transport of the document D inserted into the scan path 103 to enter the top surface 131 of the scanning window 13.

A curved reflection member 15 for collecting the light irradiated from the scan unit 12 to reflect the collected light toward the scanning window 13 is coupled to the transport guide member 14.

The curved reflection member 14 is formed of a material capable of reflecting the light, and is configured in a concave shape so as to collect the incident light and to reflect the collected light. A detailed shape and structure of the curved reflection member 15 will be described below.

The curved reflection member 15 may be coupled to a lower portion of the transport guide member 15 to collect the light L irradiated from the light emitting unit 121 and to reflect the collected light toward the scanning window 13.

Referring to a path of the light L illustrated in FIG. 2 and FIG. 3, the light L obliquely irradiated toward the curved reflection member 15 from the light emitting unit 121 may be reflected toward the scanning window 13 from the curved reflection member 15, and the light L that is transmitted through the scanning window 13 and is irradiated to the first reflector 1221 is sequentially reflected to the second and third reflectors 1222 and 1223, passes through the lens part 123, and is introduced into the image sensor 124.

The image sensor 124 may sense the light L reflected from the curved reflection member 15 to determine a size of the document D.

As described above, since the length of the scanning window 13 is formed to be longer than the width of the document D, a portion of the light irradiated toward the scanning window 13 from the light emitting unit 121 while the document D inserted into the scan path 103 passes over the top surface 131 the scanning window 13 is reflected by the document D and is introduced into the image sensor 124, and the image sensor 124 senses the light reflected by the document D to obtain the image of the document D.

Further, the remaining portions of the light irradiated toward the scanning window 13 from the light emitting unit 121 are transmitted through the top surface 131 of the scanning window 13 which is not in contact with the document D, and are irradiated to the curved reflection member 15.

The light L irradiated to the curved reflection member 15 may be collected by the curved reflection member 15 and may be again reflected toward the scanning window 13.

The light L reflected to the scanning window 13 through the curved reflection member 15 may be introduced into the image sensor 124 through the first to third reflectors 1221 to 1223.

Since the curved reflection member 15 collects the introduced light L and reflects the collected light toward the scanning window 13, an amount of reflected light introduced into the image sensor 124 through the curved reflection member 15 is greater than an amount of reflected light introduced into the image sensor 124 through the document D. Thereby, the image sensor 124 may determine the size of the scanned document D.

For example, the entirety of light irradiated by the light emitting unit 121 is reflected by the curved reflection member 15 until the document D is transported to the scan path 103, magnitude of a total amount of light detected by the image sensor 124 becomes maximum.

Then, when the document D enters the scan path 103 and starts to be in contact with the top surface 131 of the scanning window 13 from an upper end of the document D, the portion of the light irradiated from the light emitting unit 121 starts to be reflected by the document D.

As described above, since the amount of reflected light reflected by the document D is configured to be smaller than the amount of reflected light reflected by the curved reflection member 15, when the upper end of the document D starts to enter the top surface 131 of the scanning window 13, the magnitude of the total amount of reflected light introduced into the image sensor 124 is decreased, and consequently, the controller may confirm that the scan of the document D starts.

Thereafter, when the scan of the document D is completed by the lower end of the document D passing through the top surface 131 of the scanning window 13, since the total amount of light irradiated by the light emitting unit 121 is again reflected by the curved reflection member 15, the total amount of reflected light detected by the image sensor 124 is again increased.

Therefore, the controller may measure a time from a point of time at which the magnitude of the total amount of reflected light introduced into the image sensor 124 is decreased from a maximum value to a point of time at which the magnitude of the total amount of reflected light introduced into the image sensor 124 is again returned to the maximum value, and may calculate the length of the document D by multiplying the measured time by movement speed of the document D on the scan path 103.

Further, the controller may determine the width of the document D by measuring a change in the total amount of reflected light introduced into the image sensor 124 while the document D is scanned.

As described above, when the upper end of the document D starts to enter the top surface 131 of the scanning window 13, the magnitude of the total amount of reflected light introduced into the image sensor 124 is decreased.

Further, depending on the width of the document D, an amount of light reflected from the document D and an amount of light reflected from the curved reflection member 15 are differently determined while the document D passes through the top surface 131 of the scanning window 13.

Therefore, it is possible to detect the width of the document D by measuring an amount of change of the amount of reflected light sensed by the image sensor 124 and comparing the amount of change with a change value of a pre-measured amount of light for each of various kinds of standard papers at the moment when a tip of the document D enters the top surface 131 of the scanning window 13.

Further, it may be sensed that the width of the document D is not constant or the arrangement of the document D is abnormal by continuously measuring the change amount of the amount of reflected light sensed by the image sensor 124 while the document D passes through the top surface 131 of the scanning window 13. For example, in a case in which the change amount of the amount of reflected light sensed by the image sensor 124 is sharply changed, the controller may determine that the width of the document D is not constant or the arrangement of the document D is abnormal.

Other than the above-mentioned method, the size of the document D may be measured by various methods utilizing a difference between the amounts of reflected lights reflected by the curved reflection member 15 and the document D.

Further, it is also possible to directly measure the size of the document D through the image of the scanned document D.

Hereinafter, a structure for collecting and reflecting the light irradiated from the light emitting unit 121 through the curved reflection member 15 will be described with reference to FIG. 3.

As described above, the curved reflection member 15 is formed of the material capable of reflecting the light.

As illustrated in FIG. 3, the curved reflection member 15 may be disposed lower portion of the transport guide member 14 along the length direction of the transport guide member 14. Therefore, the curved reflection member 15 may be disposed along the length direction of the scanning window 13, and may reflect the light that is introduced into the bottom surface 132 of the scanning window 13 and is transmitted through the top surface 131 thereof to the first reflector 1221.

The curved reflection member 15 may be configured in a shape which is concave in an inside direction of the transport guide member 14 so as to collect and reflect the light irradiated from the light emitting unit 121.

Specifically, the transport guide member 14 includes a curved portion 141 formed to be concave in the inside direction thereof from the lower portion thereof. The curved portion 141 is formed to be extended along the length direction of the transport guide member 14.

The curved reflection member 15 may be coupled to the curved portion 141 in a shape corresponding to a shape of the curved portion 141.

For example, the curved reflection member 15 may be a thin sheet having property reflecting the light, and the curved reflection member 15 having the thin sheet shape is attached to the curved portion 141, thereby making it possible to couple the curved reflection member 15 to the lower portion of the transport guide member 14 in the concave shape.

Specifically, the curved reflection member 15 attached to the curved portion 141 may be a synthetic resin sheet having near-specular characteristics, and specifically, may be a polyethylene terephthalate (PET) sheet having the near-specular characteristics. The near-specular characteristics refer to a form in which an incident angle and a reflection angle with respect to the reflective surface are equal to each other such as a specular reflection, but the reflected light is partially diffused along a direction of the reflection angle by the reflective surface.

As described above, since the transport guide member 14 may be formed of the synthetic resin maternal, it may be easily formed in a desired shape, and as a result, the curved portion 141 of the desired shape is formed in the transport guide member 14 and a general purpose PET sheet is attached to the curved portion 141, thereby making it possible to implement the curved reflection member 15 having high reflection efficiency through the low manufacturing cost and the simple process.

Further, by coating the curved portion 141 with a material having the near-specular characteristic, for example, a PET resin having the near-specular characteristics instead of attaching the PET sheet to the curved portion 141, the curved portion 141 may collect and reflect the light incident to the curved portion 141.

As illustrated in FIG. 3, a cross section of the curved reflection member 15 cut along a document transport direction may be bent to be concave toward the inside of the transport guide member 14.

Thereby, the light irradiated from the plurality of light emitting units 121 along the length direction of the scanning window 13 may be collected and reflected by the curved reflection member 15.

Further, a cross section of the curved reflection member 15 cut along a direction perpendicular to the document transport direction may be bent to be concave toward the inside of the transport guide member 14.

Since the curved reflection member 15 is disposed along the length direction of the transport guide member 14, and the transport guide member 14 is formed to be extended along the length direction of the scanning window 13, a portion of the light that is transmitted through both end portions in a width direction of the scanning window 13 and is directed to the curved reflection member 15 may be lost to the outside of both ends of the transport guide member 14.

Therefore, loss of the light incident to the curved reflection member 15 may be decreased by forming the curved reflection member 15 to be concave toward the center thereof from both ends in the length direction thereof. Further, an amount of light collected through the curved reflection member 15 may also be increased.

The curved reflection member 15 may be disposed to be inclined with respect to the top surface 131 of the scanning window 13 in a direction facing the light irradiated from the scan unit 12, that is, a direction facing the light irradiated from the light emitting unit 121, so as to reflect the light irradiated from the scan unit 12 toward the scanning window 13.

As illustrated in FIG. 3, the light emitting unit 121 may irradiate an incident light L1 so that the center of the light irradiated to the bottom surface 132 of the scanning window 13 is inclined at a first angle $\alpha 1$.

Further, the curved reflection member 15 may be disposed to be inclined at a second angle $\alpha 2$ with respect to the top surface 131 of the scanning window 13, thereby reflecting the irradiated incident light L1 toward the scanning window 13 as reflected light L2.

Specifically, the curved reflection member 15 is disposed to be inclined so that a virtual straight line IL connecting one end 151 disposed at the upstream of the document transport direction and the other end 152 disposed at the downstream of the document transport direction forms the second angle $\alpha 2$, which is an acute angle, with respect to the top surface 131 of the scanning window 13. A length of the virtual straight line IL may be defined as the width of the curved reflection member 15.

Further, as illustrated in FIG. 3, in order to increase an amount of light of the reflected light L2 reflected through the curved reflection member 15 based on a structure in which the center of the curved reflection member 15 and the center of the first reflector 1221 are disposed in the proximity of the straight line perpendicular to the top surface 131 of the scanning window 13, the second angle $\alpha 2$ is preferably configured in a size of 0.3 to 0.475 times of the first angle $\alpha 1$. A correlation between the second angle $\alpha 2$ and the first angle $\alpha 1$ will be described below.

The incident light L1 incident to the bottom surface 132 of the scanning window 13 may be transmitted through the inside of the scanning window 13, pass through the top surface 131 of the scanning window 13, and be then incident to the curved reflection member 15, and the reflected light L2 collected from the curved reflection member 15 may be transmitted through the inside of the scanning window 13 from the top surface 131 of the scanning window 13, pass through the bottom surface 132 of the scanning window 13, and be then irradiated to the first reflector 1221 disposed below the scanning window 13.

As described above, the curved reflection member 15 may reflect a larger amount of light than the amount of light reflected by the document D by collecting the light irradiated from the light emitting unit 121 and reflecting the collected light toward the scanning window 13 and the first reflector 1221, and consequently, the image sensor 124 may accurately sense the size of the document D.

As strength of the amount of reflected light reflected through the curved reflection member 15 is increased, a difference between the amount of reflected light reflected through the curved reflection member 15 and the amount of reflected light reflected by the document D is increased, thereby making it possible to more accurately measure the size of the document D.

The magnitude of the amount of reflected light reflected through the curved reflection member 15 is mainly determined by a curvature of the curved reflection member 15 and an inclined angle of the curved reflection member 15.

Magnitude of the curvature of the curved reflection member 15 may be measured as a depth h of a reflective surface 15S from which the light is reflected on the curved reflection member 15.

As illustrated in FIG. 3, the depth h of the reflective surface 15S may be defined as a distance from the virtual straight line IL connecting one end 151 disposed at the upstream of the document transport direction of the curved reflection member 15 and the other end 152 disposed at the downstream of the document transport direction to the center of the concave reflective surface 15S.

Therefore, when the depth h of the reflective surface 15S is increased, it may be interpreted that the curvature of the curved reflection member 15 is increased, and when the depth h of the reflective surface 15S is decreased, it may be interpreted that the curvature of the curved reflection member 15 is decreased.

Thereby, by setting an optimal depth h of the reflective surface 15S and an inclined optimal second angle $\alpha 2$ of the curved reflection member 15, the magnitude of the amount of reflected light which is reflected through the curved reflection member 15 and introduced into the image sensor 124 may be set to the maximum.

Figure 4:
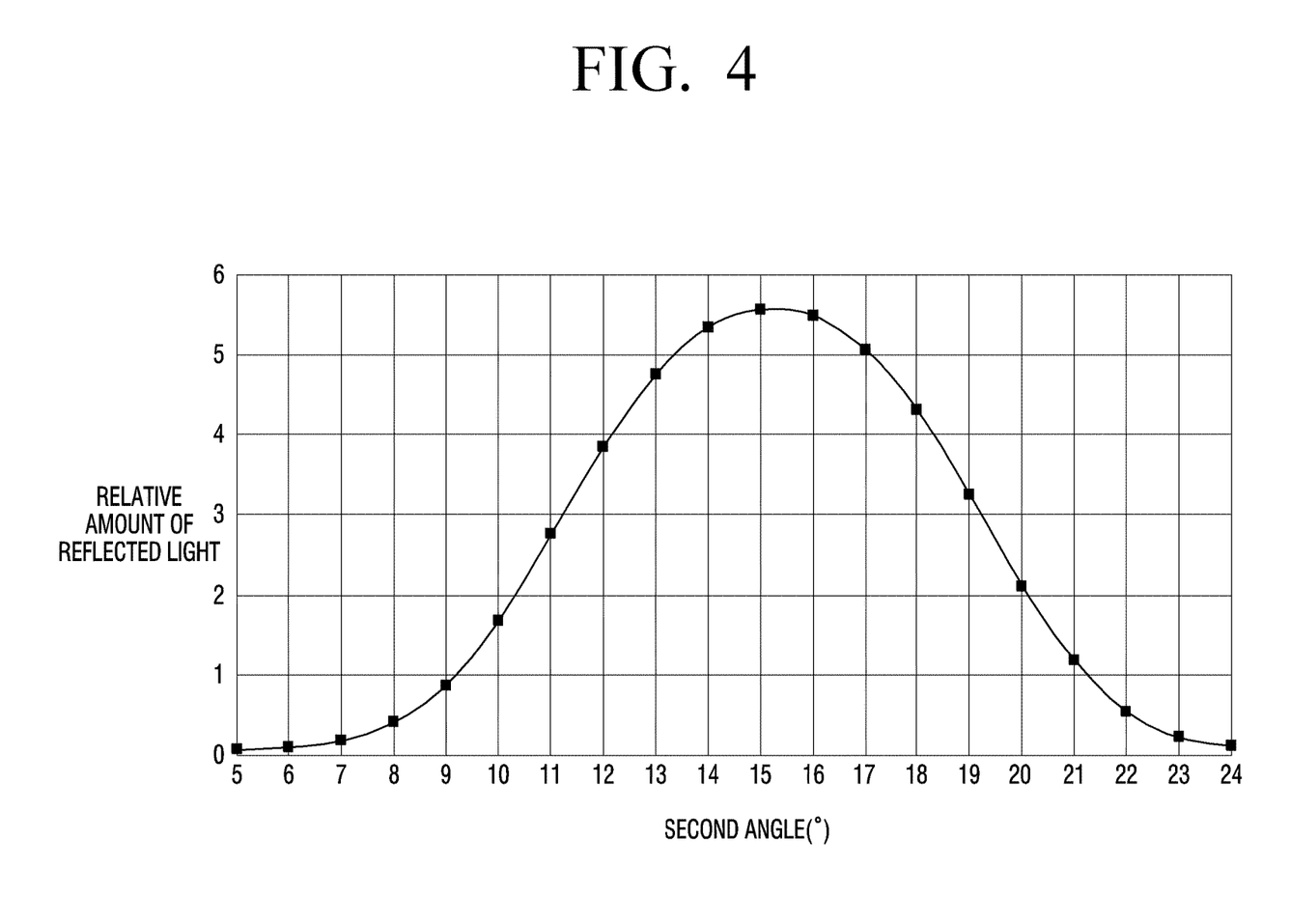
FIG. 4 is a graph obtained by measuring a relative amount of reflected light with a white paper according to a change of a second angle of a curved reflection member illustrated in FIG. 3.
Figure 5:
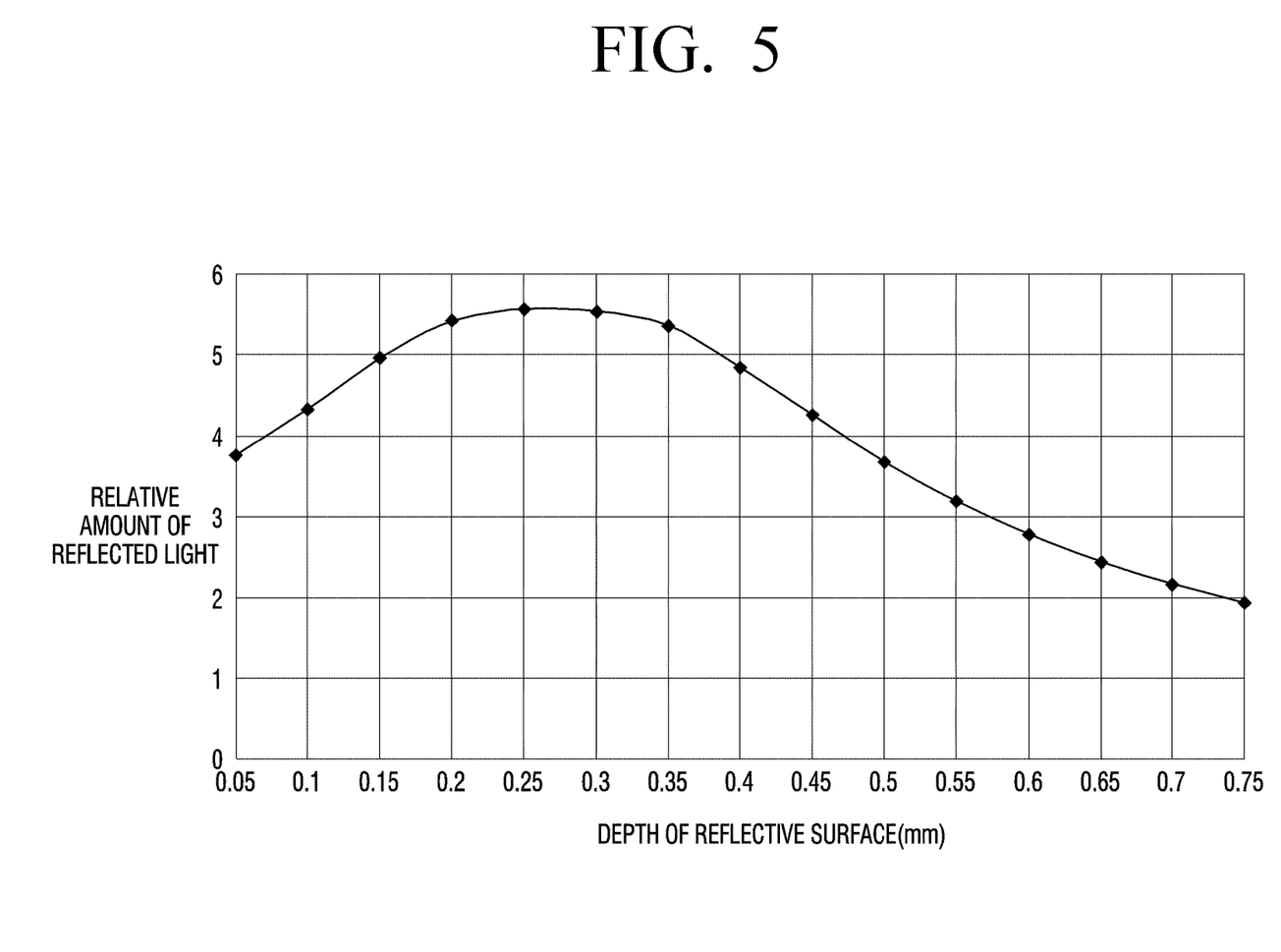
FIG. 5 is a graph obtained by measuring a relative amount of reflected light with a white paper according to a change of a depth of a reflective surface of the curved reflection member illustrated in FIG. 3.

FIG. 4 is a graph obtained by measuring a relative amount of reflected light with a white paper according to a change of the second angle $\alpha 2$ of the curved reflection member 150 illustrated in FIG. 3 and FIG. 5 is a graph obtained by measuring a relative amount of reflected light with a white paper according to a change of the depth h of the reflective surface 15S of the curved reflection member 150 illustrated in FIG. 3.

In FIGS. 4 and 5, the first angle $\alpha 1$ that the light emitting unit 121 is inclined with respect to the bottom surface 132 of the scanning window 13 is set to 40°, the length of the virtual straight line IL which may be defined as the width of the curved reflection member 15 may be set to 4 mm, and the amounts of reflected light which are experimentally measured by the image sensor 124 according to the changes of the second angle $\alpha 2$ of the curved reflection member 15 and the depth h of the reflective surface 15S of the curved reflection member 15 are illustrated as the graphs.

Further, in FIGS. 4 and 5, the amount of reflected light reflected from the white paper, which is generally used, as one example of the document D disposed on the scan path 103, is set to a numeric value of 1, and a measured relative amount of reflected light of the curved reflection member 15 for the white paper is indicated as the graphs.

Hereinafter, an optimal structure of the curved reflection member 15 having increased reflection efficiency will be described with reference to FIGS. 3 to 5.

FIG. 4 illustrates the amount of reflected light which is experimentally measured by the image sensor 124 as the second angle α2 of the curved reflection member 15 is changed from 5° to 24°.

Since the second angle α2 of the curved reflection member 15 determines a path of the reflected light L2 reflected from the curved reflection member 15, the second angle α2 has a greater effect on the magnitude of the amount of reflected light of the curved reflection member 15 introduced into the image sensor 124 than the depth h of the reflective surface 15S. Therefore, in FIG. 4, the relative amount of reflected light according to the change in the second angle α2 is measured and illustrated in a state in which the depth h of the reflective surface 15S of the curved reflection member 15 is set to 0.25 mm.

As illustrated in FIG. 4, it may be confirmed that the strength of the amount of reflected light reflected from the curved reflection member 15 and measured through the image sensor 124 is greatest when the second angle α2 is 15°.

Further, in a section in which the second angle α2 is 12° to 19°, the strength of the amount of reflected light reflected from the reflection member 15 is measured to be three times or more compared with the amount of reflected light reflected from the white paper, and in the above-mentioned angle range, the size of the document D may be accurately measured. Accordingly, the second angle α2 may be configured to be 0.3 to 0.475 times of the first angle α1.

In addition, in a section in which the second angle α2 is 14° to 17°, the strength of the amount of reflected light reflected from the curved reflection member 15 is measured to be five times or more compared with the amount of reflected light reflected from the white paper, and in the above-mentioned angle range, the size of the document D may be more precisely measured.

Further, in a case in which the second angle α2 is 9° or less, or is 22° or more, since most of the reflected light L2 reflected from the curved reflection member 15 is not reflected in a direction toward the scanning window 13 and the first reflector 1221, it may be confirmed that the amount of reflected light reflected from the curved reflection member 15 measured by the image sensor 124 is measured to be smaller than the amount of reflected light of the white paper.

FIG. 5 is a graph in which the second angle α2 of the curved reflection member 15 is set to 15°, which is the optimal angle measured in FIG. 4, and the amount of reflected light measured by the image sensor 124 as the depth h of the reflective surface 15S of the curved reflection member 15 is changed from 0.05 mm to 0.75 mm is indicated.

As illustrated in FIG. 5, it may be confirmed that the strength of the amount of reflected light reflected from the curved reflection member 15 and measured through the image sensor 124 is greatest when the depth h of the reflective surface 15S is 0.25 mm.

Further, in a range in which the depth h of the reflective surface 15S is 0.05 mm to 0.55 mm, the strength of the amount of reflected light reflected from the curved reflection member 15 is measured to be three times or more compared with the amount of reflected light reflected from the white paper, and in the above-mentioned length range, the size of the document D may be more precisely measured. Accordingly, the depth h of the reflective surface 15S of the curved reflection member 15 may be configured to be 0.0125 to 0.1375 times of the width of the curved reflection member 15.

As such, it may be confirmed that the amount of reflected light reflected through the curved reflection member 15 and introduced into the image sensor 124 is changed depending on the second angle α2 at which the curved reflection member 15 is inclined and the depth h of the reflective surface 15S of the curved reflection member 15.

Further, in a structure in which the first angle α1 at which the light emitting unit 121 is inclined with respect to the bottom surface 132 of the scanning window 13 is set to 40°, the width of the curved reflection member 15 is configured to be about 4 mm, and the center of the curved reflection member 15 and the center of the first reflector 1221 are disposed in the proximity of the straight line perpendicular to the top surface 131 of the scanning window 13, it is possible to maximize an amount of light that the light emitted from the light emitting unit 121 is reflected from the curved reflection member 15 and is incident to the image sensor 124 through at least one reflector by configuring the second angle α2 of the curved reflection member 15 to be 15° and configuring the depth h of the reflective surface 15S to be 0.25 mm.

However, the first angle α1 of the light emitting unit 121 may be changed depending on the structure of the image forming apparatus 1 and the width of the curved reflection member 15 may also be changed depending on the width of the scanning window 13, and accordingly, the second angle α2 of the curved reflection member 15 and the depth h of the reflective surface 15S capable of increasing reflection efficiency through the curved reflection member 15 may also be variously changed.

Figure 6:
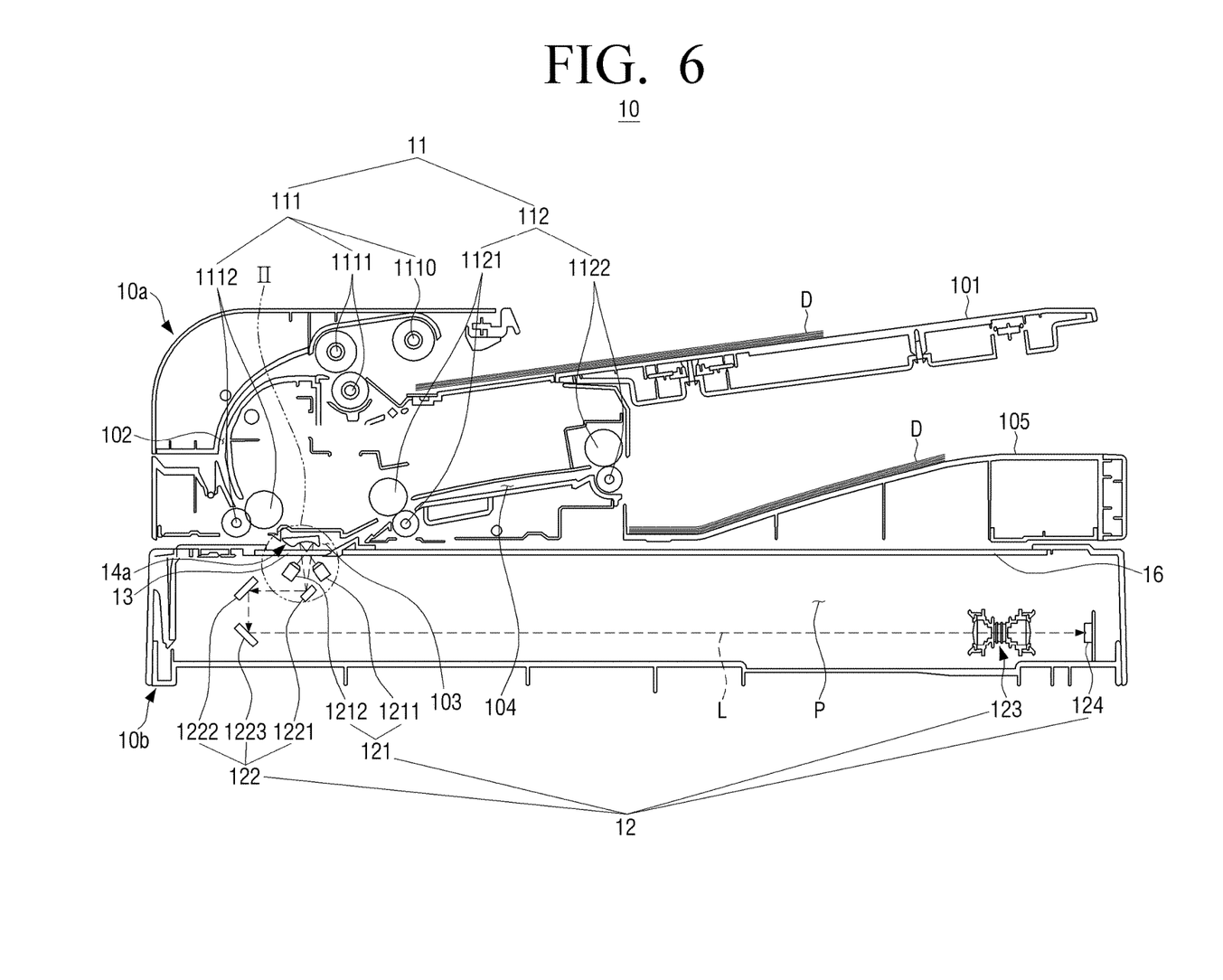
FIG. 6 is a side view illustrating the inside of a scanner according to another exemplary embodiment of the present disclosure.
Figure 7:
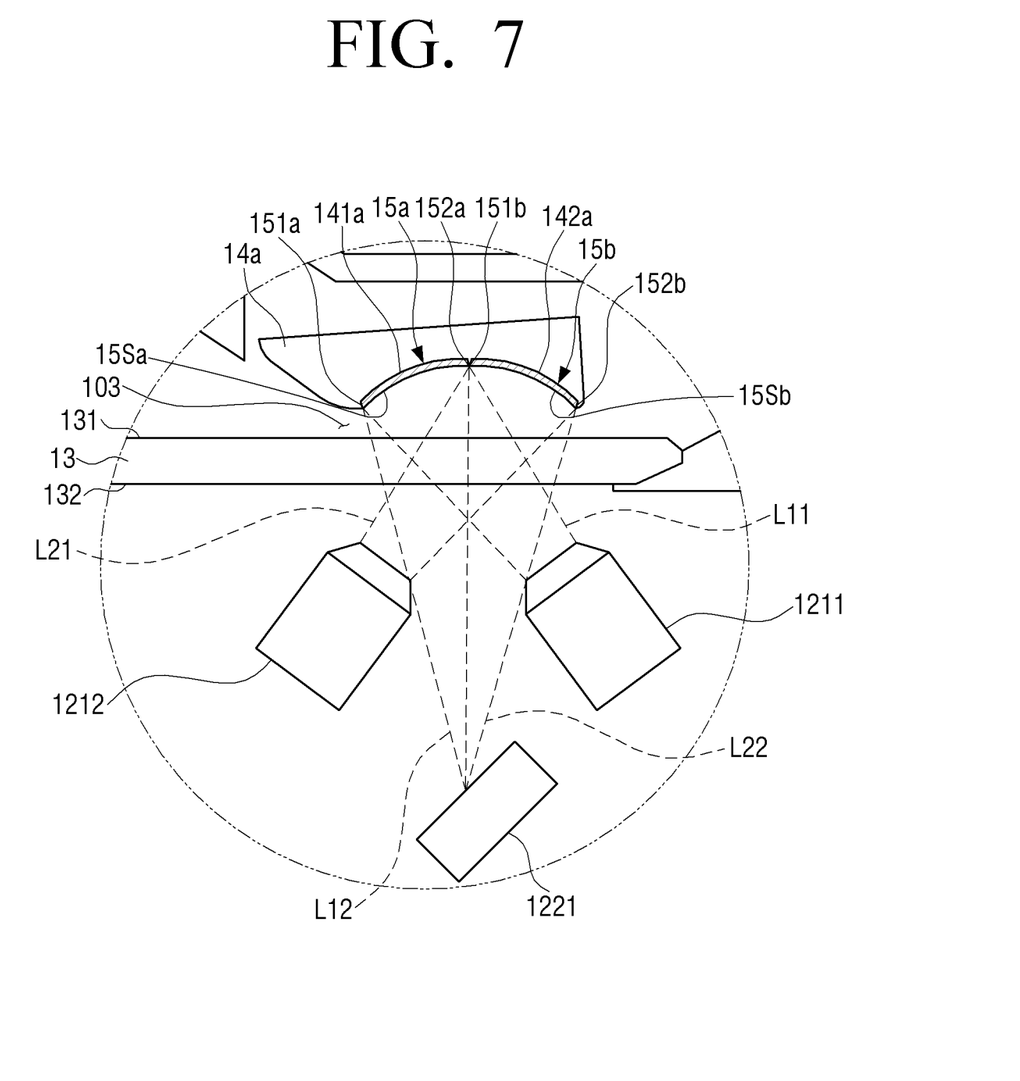
FIG. 7 is an enlarged view of a portion of II of the scanner illustrated in FIG. 6.

FIG. 6 is a side view illustrating the inside of a scanner 10 according to another exemplary embodiment of the present disclosure and FIG. 7 is an enlarged view of a portion of II of the scanner 10 illustrated in FIG. 6.

Since the scanner 10 illustrated in FIG. 6 has the same configuration as the scanner 10 illustrated in FIG. 2 except for the transport guide member, the curved reflection member, and the light emitting unit, a description of the same configuration will be omitted, and hereinafter, a transport guide member 14a, curved reflection members 15a and 15b, and light emitting units 1211 and 1212 of the scanner 10 according to another exemplary embodiment of the present disclosure will be described with reference to FIGS. 6 and 7.

As illustrated in FIGS. 6 and 7, the scan unit 12 includes first and second light emitting units 1211 and 1212 that each irradiate light from a direction inclined with respect to the bottom surface 132 of the scanning window 13.

Further, first and second curved reflection members 15a and 15b that collect the light irradiated from the first and second light emitting units 1211 and 1212 and reflect the collected light toward the scanning window 13 may be coupled to a lower portion of the transport guide member 14a.

The first curved reflection member 15a and the first light emitting unit 1211 have the same configuration and arrangement as the curved reflection member 15 and the light emitting unit 121 illustrated in FIG. 3, and the second curved reflection member 15a and the second light emitting unit 1212 are disposed to be symmetrical with the first curved reflection member 15a and the first light emitting unit 1211.

Therefore, first incident light L11 irradiated toward the first curved reflection member 15a from the first light emitting unit 1211 may be collected from a first reflective surface 15Sa of the first curved reflection member 15a and may be reflected toward the scanning window 13, and first reflected light L12 reflected from the first curved reflection member 15a may be sequentially reflected by the first to third reflectors 1221 to 1223 and may be introduced into the image sensor 124.

Further, second incident light L21 irradiated toward the second curved reflection member 15b from the second light emitting unit 1212 may be collected from a second reflective surface 15Sb of the second curved reflection member 15b and may be reflected toward the scanning window 13, and second reflected light L22 reflected from the second curved reflection member 15b may be sequentially reflected by the first to third reflectors 1221 to 1223 and may be introduced into the image sensor 124.

As such, the scanner 10 according to another exemplary embodiment of the present disclosure includes a plurality of light emitting units 1211 and 1212, collects the lights irradiated through the plurality of light emitting units 1211 and 1212 through a plurality of curved reflection members 15a and 15b, and simultaneously reflects the collected lights toward the scanning window 13, thereby making it possible to increase the amount of reflected light irradiated to the image sensor 124.

Therefore, it is possible to more precisely measure the size of the document D by increasing a difference between an amount of reflected lights reflected from the plurality of curved reflection members 15a and 15b and introduced into the image sensor 124 and an amount of reflected light reflected by the document D and introduced into the image sensor 124.

Hereinabove, while various exemplary embodiments of the present disclosure have been separately described, the respective exemplary embodiments are not necessarily solely implemented, and the configuration and the operation of the respective exemplary embodiments may also be implemented in combination with other exemplary embodiments.

Hereinabove, although the exemplary embodiments of the present disclosure have been shown and described, it should be understood that the present disclosure is not limited to the disclosed embodiments and may be variously modified without departing from the spirit and the scope of the present disclosure. Therefore, the modifications should not be understood separately from the technical spirit or scope of the present disclosure.

What is claimed is:

1. An image forming apparatus including a scanner and a printing apparatus, wherein the scanner includes:
a scanning window;
a transport unit to transport a document to a top surface of the scanning window;
a scan unit, disposed below a bottom surface of the scanning window, to obliquely irradiate light toward the bottom surface of the scanning window to scan the document;
a transport guide member disposed above the top surface of the scanning window to guide the transport of the document; and
a curved reflection member, coupled to the transport guide member, to reflect the light irradiated from the scan unit toward the scanning window.

2. The image forming apparatus as claimed in claim 1, wherein the curved reflection member is disposed below the transport guide member, and has a shape which is concave with respect to the scan unit.

3. The image forming apparatus as claimed in claim 2, wherein the transport guide member includes a curved portion formed to be concave with respect to the scan unit, and
the curved reflection member is coupled to the curved portion, and the shape of the curved reflection member corresponds to a shape of the curved portion.

4. The image forming apparatus as claimed in claim 3, wherein the curved reflection member includes a synthetic resin sheet having near-specular characteristics.

5. The image forming apparatus as claimed in claim 4, wherein the synthetic resin sheet is a polyethylene terephthalate (PET) sheet.

6. The image forming apparatus as claimed in claim 2, wherein the curved reflection member is concave with respect to the scan unit along a direction of the transport of the document.

7. The image forming apparatus as claimed in claim 6, wherein the curved reflection member is concave with respect to the scan unit along a direction perpendicular to the direction of the transport of the document.

8. The image forming apparatus as claimed in claim 6, wherein a depth of a reflective surface of the curved reflection member is 0.0125 to 0.1375 times of a width of the curved reflection member.

9. The image forming apparatus as claimed in claim 8, wherein the width of the curved reflection member is 4 mm, and
the depth of the reflective surface is 0.25 mm.

10. The image forming apparatus as claimed in claim 6, wherein the curved reflection member is disposed to be inclined with respect to the top surface of the scanning window in a direction towards the light irradiated from the scan unit.

11. The image forming apparatus as claimed in claim 10, wherein the scan unit includes:
an image sensor to convert incident light on the image sensor into image data;
a light emitting unit to obliquely irradiate the light at a first angle with respect to the bottom surface of the scanning window; and
at least one reflector, disposed below the scanning window, to reflect the light reflected from the curved reflection member to the image sensor.

12. The image forming apparatus as claimed in claim 11, wherein the curved reflection member is disposed to be inclined so that a virtual straight line connecting one end disposed at an upstream of the document transport direction and the other end disposed at a downstream of the document transport direction forms a second angle, which is an acute angle, with respect to the top surface of the scanning window.

13. The image forming apparatus as claimed in claim 12, wherein the second angle is 0.3 to 0.475 times of the first angle.

14. The image forming apparatus as claimed in claim 13, wherein
the first angle is 40°, and
the second angle is 14° to 17°.

15. The image forming apparatus as claimed in claim 14, wherein
a width of the curved reflection member is 4 mm,
a depth of a reflective surface of the curved reflection member is 0.25 mm,
the first angle is 40°, and
the second angle is 15°.

16. An image forming apparatus comprising:
a printing apparatus; and
a scanner, the scanner including:
- a scan unit configured to irradiate light towards a document passing through a scan path of the scanner, to receive the irradiated light to scan the document, and to determine a size of the document based on the received light, and
- a curved reflection member, disposed above the document on the scan path, to reflect the light irradiated from the scan unit back to the scan unit.

17. The image forming apparatus as claimed in claim 16, wherein the curved reflection member is concave with respect to the scan unit along a direction in which the document passes through the scan path.

18. The image forming apparatus as claimed in claim 17, wherein the curved reflection member is disposed to be inclined with respect to the document passing through the scan path in a direction facing the light irradiated from the scan unit.

19. The image forming apparatus as claimed in claim 18, wherein the curved reflection member includes a polyethylene terephthalate (PET) sheet having near-specular characteristics.

20. An image forming apparatus, comprising:
a printing apparatus; and
a scanner, the scanner including:
- a scanning window,
- a transport unit to transport a document to a top surface of the scanning window,
- first and second light emitting units, disposed below a bottom surface of the scanning window, to obliquely irradiate light toward the bottom surface of the scanning window,
- an image sensor to convert incident light on the image sensor into image data,
- a transport guide member disposed above the top surface of the scanning window to guide the transport of the document,
- first and second curved reflection members, coupled to the transport guide member, to reflect the light irradiated from the first and second light emitting units toward the scanning window, and
- at least one reflector, disposed below the scanning window, to reflect the light reflected from the first and second curved reflection members toward the image sensor.

* * * * *

UNITED STATES PATENT AND TRADEMARK OFFICE
CERTIFICATE OF CORRECTION

PATENT NO. : 10,158,776 B2
APPLICATION NO. : 15/673674
DATED : December 18, 2018
INVENTOR(S) : Jeong-yul Kim et al.

It is certified that error appears in the above-identified patent and that said Letters Patent is hereby corrected as shown below:

In the Claims

In Column 17, Claim 16, Line 4, after "unit" delete "configured".

Signed and Sealed this
Ninth Day of April, 2019

Andrei Iancu
*Director of the United States Patent and Trademark Office*